United States Patent
Carbonell et al.

(10) Patent No.: US 9,684,917 B2
(45) Date of Patent: Jun. 20, 2017

(54) PRODUCT INTEROPERABILITY DETERMINATION

(71) Applicant: International Business Machines Corporation, Armonk, NY (US)

(72) Inventors: Lee A. Carbonell, Flower Mound, TX (US); Tsz S. Cheng, Grand Prairie, TX (US); Jeffrey L. Edgington, Keller, TX (US); Pandian Mariadoss, Allen, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/057,493

(22) Filed: Mar. 1, 2016

(65) Prior Publication Data

US 2016/0189265 A1   Jun. 30, 2016

Related U.S. Application Data (63) Continuation of application No. 14/520,714, filed on Oct. 22, 2014, now Pat. No. 9,292,496.

(51) Int. Cl.

| | |
|---|---|
| *G06F 17/00* | (2006.01) |
| *G06Q 30/06* | (2012.01) |
| *H04L 12/58* | (2006.01) |
| *H04L 29/08* | (2006.01) |
| *H04L 29/06* | (2006.01) |
| *G06Q 30/02* | (2012.01) |
| *G06F 17/24* | (2006.01) |
| *G06F 17/27* | (2006.01) |

(52) U.S. Cl.
CPC ....... *G06Q 30/0613* (2013.01); *G06F 17/243* (2013.01); *G06F 17/2785* (2013.01); *G06Q 30/02* (2013.01); *G06Q 30/0623* (2013.01); *G06Q 30/0641* (2013.01); *H04L 51/16* (2013.01); *H04L 67/02* (2013.01); *H04L 69/24* (2013.01)

(58) Field of Classification Search
USPC .................................................. 235/375–380
See application file for complete search history.

(56) References Cited

U.S. PATENT DOCUMENTS

| | | |
|---|---|---|
| 7,537,158 B1 | 5/2009 | Cox et al. |
| 8,073,844 B2 | 12/2011 | Bhesania |
| 2014/0122936 A1 | 5/2014 | Kaur |

OTHER PUBLICATIONS

Carbonell et al., "Product Interoperability Determination", U.S. Appl. No. 14/520,714, filed Oct. 22, 2014, 36 pages.

*Primary Examiner* — Jamara Franklin
(74) *Attorney, Agent, or Firm* — Cuenot, Forsythe & Kim, LLC (57) ABSTRACT

A user input pertaining to a question is received. Based on the question a new message is generated and posted in at least one web based forum. Responses to the new message are monitored and analyzed to determine whether, for each response, the response pertains to a subject of the question. Responsive to determining that at least one response pertains to the subject of the question, information contained in the response is presented to the user.

20 Claims, 5 Drawing Sheets

PRODUCT INTEROPERABILITY DETERMINATION

BACKGROUND

The present invention relates to computer information systems.

Consumer electronic products are becoming more sophisticated and more interoperable with one another. For example, various smart phone applications are commercially available which enable users to control various devices with a smart phone. Thus, users need not keep track of and maintain numerous remote control units for their various devices. In another example, modern televisions sometimes include the ability to control, via the televisions, other peripheral devices/systems, such as audio systems (e.g., sound bars). Still, numerous electronic products interoperable with other products continue to be developed and brought to market.

SUMMARY

A method includes receiving from a user, via a user interface, at least one user input pertaining to a question. The method also can include based on the question, generating, by at least one processor, a new message and posting the new message in at least one web based forum, the new message based on the question, wherein the new message is automatically generated and posted by the processor without interaction of the user with the web based forum. The method also can include monitoring, by the processor, responses to the new message posted in the web based forum. The method also can include analyzing, by the processor, the responses to the new message posted in the web based forum to determine whether, for each response, the response pertains to a subject of the question. The method also can include responsive to determining that at least one response to the new message posted in the web based forum pertains to subject of the question, presenting to the user, by the processor, information contained in the response.

A system includes a processor programmed to initiate executable operations. The executable operations include receiving from a user, via a user interface, at least one user input pertaining to a question. The executable operations also can include based on the question, generating a new message and posting the new message in at least one web based forum, the new message based on the question, wherein the new message is automatically generated and posted by the processor without interaction of the user with the web based forum. The executable operations also can include monitoring responses to the new message posted in the web based forum. The executable operations also can include analyzing the responses to the new message posted in the web based forum to determine whether, for each response, the response pertains to a subject of the question. The executable operations also can include responsive to determining that at least one response to the new message posted in the web based forum pertains to subject of the question, presenting to the user information contained in the response.

A computer program includes a computer readable storage medium having program code stored thereon. The program code is executable by a processor to perform a method. The method includes receiving from a user, via a user interface, at least one user input pertaining to a question. The method also can include based on the question, generating, by the processor, a new message and posting the new message in at least one web based forum, the new message based on the question, wherein the new message is automatically generated and posted by the processor without interaction of the user with the web based forum. The method also can include monitoring, by the processor, responses to the new message posted in the web based forum. The method also can include analyzing, by the processor, the responses to the new message posted in the web based forum to determine whether, for each response, the response pertains to a subject of the question. The method also can include responsive to determining that at least one response to the new message posted in the web based forum pertains to subject of the question, presenting to the user, by the processor, information contained in the response.

DETAILED DESCRIPTION

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to computer information systems and, more particularly, to a system that determines interoperability of electronic products. The system can be provided by retailers of electronic products to aid users in making purchasing decisions. Specifically, the system can help users determine which products will suitably interoperate with one another based on the user's needs.

In accordance with the inventive arrangements disclosed herein, via a user interface, a user can submit a question regarding interoperability of an electronic product with one or more other electronic products. The user question can be analyzed, using artificial intelligence and natural language processing, to derive a computer understandable meaning of the question pertaining to interoperability of the electronic product with the other electronic products. Based on the computer understandable meaning of the question, one or more queries to search a variety of information resources for answers to the question can be generated. Such resources can include, but are not limited to, manuals of the electronic products, reviews of the electronic products, posted messages in forums regarding the electronic products, web sites pertaining to the electronic products, blogs including information related to the electronic products, and so on. Information received in response to such queries can be received and stored to a knowledge datastore. The system can access the information from the knowledge datastore and present the information to the user via the user interface.

Further, based on the computer understandable meaning of the question, the system can generate one or more new messages and post such messages in one or more web based forums. A new posted message can include a question, generated by the system, asking whether the first product is interoperable with the second product. For example, a new posted message can be automatically created in an existing thread or created to start a new thread. The system can monitor the forum for responses to the new message. A response can be, for example, a subsequent message posted in the same thread in which the new message is posted. Responsive to identifying one or more responses, the system can analyze the responses to determine whether the responses pertain to the interoperability of the first electronic product with the second electronic product. If so, the system can store the responses to the knowledge datastore. The system also can present the responses to the user via the user interface. Accordingly, the user can determine interoperability of the first electronic product with the second electronic product. Moreover, the information stored in the knowledge datastore can be presented to other users having similar questions regarding interoperability of the first electronic product with the second electronic product.

Several definitions that apply throughout this document now will be presented.

As defined herein, the term "electronic product" means an electronic device or an electronic system offered for sale.

As defined herein, the term "natural language analysis" means a process that derives a computer understandable meaning from at least one human language word or phrase. The computer understandable meaning of a particular word may be based on the context of a phrase in which the word is used. In this regard, the computer understandable meaning of a word is the computer understandable meaning in the context of the phrase in which the word is used. For example, a word may have a plurality of different definitions. Based on the context of the phrase in which the word is used, the computer understandable meaning of the word corresponds to the definition of the word that is applicable to the word in that context. Artificial intelligence and natural language processing is used to derive the computer understandable meaning of a word or phrase.

As defined herein, the term "natural language processing system" means a system that performs natural language analysis. A natural language processing system implements artificial intelligence to perform the natural language processing.

As defined herein, the term "computer understandable meaning" means computer readable data that conveys, in a digital format, a meaning of at least one human language word or phrase.

As defined herein, the term "human language" is a language spoken or written by human beings that is not a computer programming language. A "human language" may be referred to as a "natural language."

As defined herein, the term "web based forum" means is an online discussion site where people can post messages that are viewable by other people. For example, people can hold conversations in a web based forum by posting messages. Some messages posted in a web based forum may be responses to other posted messages, or ask questions related to other posted messages.

As defined herein, the term "post" means to enter a message in a thread of a web based forum. A new thread can be created in which to enter the message, or the message can be entered into an existing thread.

As defined herein, the term "retail partner system" means one or more processing systems provided by a retailer or manufacturer of electronic products which provide information related to the electronic products.

As defined herein, the term "knowledge datastore" means a computer readable data structure stored on a computer readable storage medium." A knowledge datastore can include, for example, one or more databases, one or more data tables, or the like.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "automatically" means without user intervention.

As defined herein, the term "user" means a person (i.e., a human being).

As defined herein, the term "user name" means an identifier that may be assigned to a person or a system. Although a user, as defined herein, is a person, the term "user name," as used herein, is not limited in this regard and can be assigned to a system, even though the system is not a human being.

Figure 1:
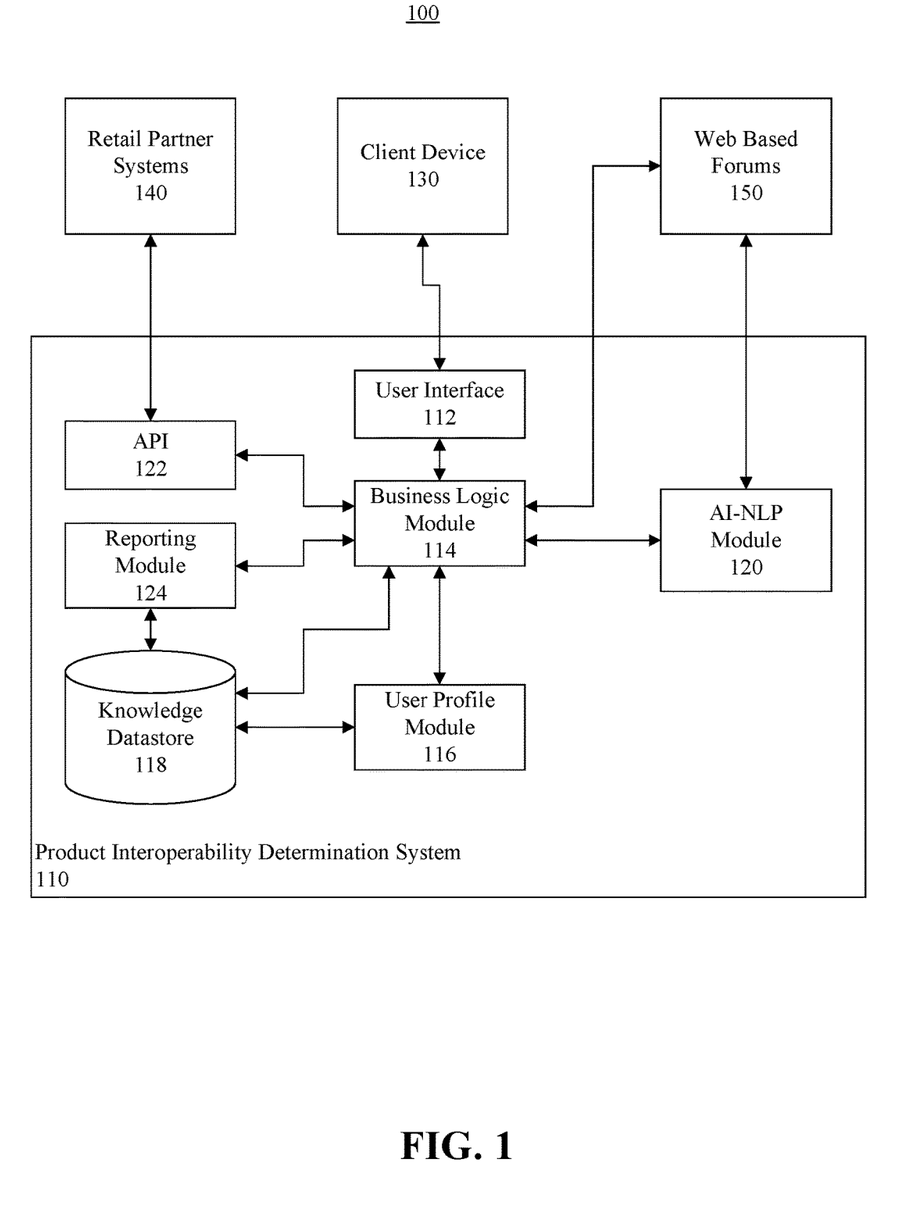
FIG. 1 is a block diagram illustrating an example of a computing environment.

FIG. 1 is a block diagram illustrating an example of a computing environment (hereinafter "environment") 100. The computing environment can include a product interoperability determination system (hereinafter "system") 110. The system 110 can include one or more applications and/or modules, and can be executed via one or more processors. For example, the system 110 can be executed on a single processing system (e.g., server), or different components of the system 110 can be executed on different processing systems that are communicatively linked via one or more networks.

The system 110 can include a user interface 112 configured to be presented to a user interacting with the system 110. For example, the user can interact with the system 110 via a client device 130 (e.g., a workstation, desktop computer, laptop computer, netbook computer, tablet computer, smart phone, personal digital assistant, gaming console, set top box, Internet appliance, or the like). In illustration, the user can initiate a user session with the system 110 via the client device 130 over one or more suitable networks (e.g., the Internet). During the user session, communications can be exchanged between the client device 130 and system 110 to present the user interface 112 to the user, for example as a web page. In this regard, the client device 130 can include a web browser or other application configured to present the user interface 112 to the user via a suitable display and/or audio system connected to, or included in, the client device 130. The web page can present information to the user and prompt the user to enter various data.

The system also can include a business logic module 114. The business logic module 114 can interact with the user interface 112 to present information to the user and receive data input by the user via the user interface 112. For example, the business logic module 114 can receive user profile information from the user via the user interface 112 and communicate the user profile information to a user profile module 116. The user profile module 116 can store the user profile information to a knowledge datastore 118. The knowledge datastore 118 can include one or more data tables and/or databases stored on one or more computer readable storage devices, for example bulk storage devices.

Via the user interface 112, the business logic module 114 also can receive other data from the user. For example, the user can enter menu selections, text and/or spoken utterances, detected by the user interface 112, asking one or more questions pertaining to interoperability of an electronic product with one or more other electronic products. The business logic module 114 can communicate the received data to an artificial intelligence-natural language processing (AI-NLP) module 120 (or external AI-NLP system). The AI-NLP module 120 can perform a natural language analysis of the question to derive a computer understandable meaning of the question, and communicate the computer understandable meaning to the business logic module 114. The business logic module 114 can store the computer understandable meaning of the question to the knowledge datastore 118 to add to and/or update existing knowledge data stored therein.

Further, based on the computer understandable meaning of the question, the business logic module 114 can query the knowledge datastore 118 for data pertaining to the user's question. For example, the business logic module 114 can generate a query formatted using structured query language (SQL) or any other suitable computer programming language. The business logic module 114 can process data retrieved in response to the query and present the data to the user via the user interface 112. For example, if the question entered by the user asks "can I control the X sound bar and my Y television using a single remote control unit," and the data retrieved by the query indicates that both the X sound bar and the Y television can be controlled using a single remote control unit, via the user interface 112, the business logic module 114 can present corresponding information to the user. Similarly, if the data retrieved by the query indicates that the X sound bar and the Y television cannot both be controlled using a single remote control unit, the business logic module 114 can present corresponding information to the user.

In some cases, the results of the query may not provide data that indicates whether the electronic products identified by the user are interoperable. For example, the knowledge datastore 118 may not presently contain data corresponding to the question. Also, in some cases, the knowledge datastore 118 may contain conflicting information. In any of such cases, further processes may need to be performed to obtain suitable data that answers the user's question. The business logic module 114 can implement and/or initiate such other processes.

In illustration, the business logic module 114 can access an application programming interface (API) 122 configured to interface with processing systems 140 (e.g., servers) of retail partners, via one or more networks (e.g., the Internet), to access data pertaining to the question of whether the first electronic product is interoperable with a second electronic product. For example, via the API 122, the business logic module 114 can query or scan the retail partner systems 140, based on the computer understandable meaning of the question, to retrieve data indicating interoperability of products offered by the retail partners with other products. For instance, the business logic module 114 can scan online or in-store product descriptions. If the results of such queries/scans provide data useful for answering the user's question, the business logic module 114 can store the data in the knowledge datastore 118, for example via a reporting module 124, and present corresponding information to the user via the user interface 112.

Certain hidden and interoperable features, however, often do not appear in online or in-store product descriptions, which tend to only highlight key features for sales and marketing purpose. The subtle or even non-documented features/characteristics sometimes can only be found in product manuals and/or online user feedbacks/reviews. However, for users with less experience or technical knowledge, they may not be aware or knowledgeable enough to research those "hidden" interoperable features that may be linked to the products they may already own or may acquire later. Nonetheless, the business logic module 144 further can be configured to scan or query the retail partner systems 140, using the API 122, for other online information related to the products. For example, the business logic module 144 can scan product manuals, technical specifications for the products, user reviews of the products, or the like. Again, if the results of such queries/scans provide data useful for answering the user's question, the business logic module 114 can store the data in the knowledge datastore 118, for instance via a reporting module 124, and present corresponding information to the user via the user interface 112.

Still, in some cases, the information accessed from the retail partner systems 140 may not include data necessary to form an answer to the user's question. Thus, data pertaining to whether a particular electronic product is interoperable with another electronic product may not be available to be accessed. Nonetheless, the business logic module 114 can be configured to search other online information sources to formulate a suitable answer. For example, the business logic module 114 can initiate the AI-NLP module 120 to search one or more web based forums 150 in order derive an answer to the question presented by the user. In illustration, the AI-NLP module 120 can crawl the web based forums 150 to find an answer to the question. The web based forums 150 can include, but are not limited to, user forums, enthusiast bulletin boards, vendor forums, social media websites, crowdsourcing websites, and the like. In this regard, the AI-NLP module 120 can perform a natural language search of the web based forums 150. Natural language searches are known to those skilled in the art. The AI-NLP module 120 can process results from the web based forums 150, and communicate corresponding data to the business logic module 114. If the results of such searches provide data useful for answering the user's question, the business logic module 114 can store corresponding data, via the reporting module 124, in the knowledge datastore 118 and present corresponding information to the user via the user interface 112. If, however, the question still is unanswered, the business logic module 114 can again implement additional processes to attempt to derive an answer.

In illustration, the business logic module 114 can interface with the AI-NLP module 120 to determine whether any threads relevant to the question are relevant to the question. If so, the business logic module 114 can post the question as a message in one or more of such threads. The business logic module 114 also can start new threads in one or more of the web based forums 150 with a posted message containing the question. For example, if a particular forum is relevant to the question, but there are no recent threads that pertain to the question, the business logic module 114 can begin a new thread by posting a message that asks question. If a particular forum already contains a recent thread relevant to the question, but does not specifically include the question, the business logic module 114 can post the question in that thread. The business logic module 114 can interact with the AI-NLP module 120 for artificial intelligence and natural language processing used in determining whether threads relevant to the question already exist.

By way of example, the business logic module 114 can generate, based on the computer understandable meaning of the question pertaining to interoperability of a first electronic product with a second electronic product, a new message posted in at least one web based forum 150. The message post can ask, among other things, whether the first electronic product is interoperable with the second electronic product. Notably, the new message can be automatically generated by the business logic module 114, and posted in the web based forum 150, without interaction of the user with the web based forum(s) 150. Thus, the user need not create an account with the web based forum(s) 150, the user need not monitor the web based forum(s) 150 for answers to the posted question, etc. Indeed, the identity of the user need not be indicated in the posted message. Instead, the AI-NLP module 120 can post the question using an identifier (e.g., user name) established for the system 110.

The business logic module 114 can monitor threads in the web based forums 150 in which the business logic module 114 posted the question. For example, the business logic module 114 can maintain in the knowledge datastore 118, or other memory elements, a listing of questions posted by the business logic module 114 in various web based forums 150. Such listings can identify the web based forums 150 in which the questions are posted, as well as indicate the individual messages/threads. The business logic module 114 can periodically scan the listings and, for each listing, access the corresponding web based forum(s) 150 to determine whether a response to the question has been posted. Responsive to identifying a response to the question, the business logic module 114 can analyze the response to determine whether the response pertains to the interoperability of the first electronic product with the second electronic product. Responsive to determining that at least one response to the new message posted in the web based forum(s) 150 pertains to the interoperability of the first electronic product with the second electronic product, the business logic module 114 can store, via the reporting module 124, the response in the knowledge datastore 118.

Further, responsive to determining that at least one response to the new message posted in the web based forum 150 pertains to the interoperability of the first electronic product with the second electronic product, the business logic module 114 can alert the user, via the user interface 112, of the response. For example, the business logic module 114 can present to the user information pertaining to the new message posted. Such information can include the content of the new message and/or a link (e.g., hyperlink) to the new message in the web based forum 150. In another arrangement, the business logic module 114 can interface with an electronic messaging client (not shown) to generate an electronic message (e.g., an e-mail, text message, instant message, or the like) to the user indicating that the response to the question has been identified. Such electronic message can present the response and/or provide a link to the new message. In either case, the information presented to the user can be retrieved by the business logic module 114, for instance using the reporting module 124, from the knowledge datastore 118.

At this point it should be noted that the system 110 can communicate with the client device 130, retail partner systems 140 and the web based forums 150 using one or more suitable networks. Further, if various components of the system 110 are executed on different processing systems, the different processing systems can communicate among each other using one or more suitable networks. A network is the medium used to provide communications links between various devices and data processing systems connected together within the environment 100. A network may include connections, such as wire, wireless communication links, or fiber optic cables. A network can be implemented as, or include, any of a variety of different communication technologies such as a WAN, a LAN, a wireless network, a mobile network, a Virtual Private Network (VPN), the Internet, the Public Switched Telephone Network (PSTN), or the like.

Figure 2:
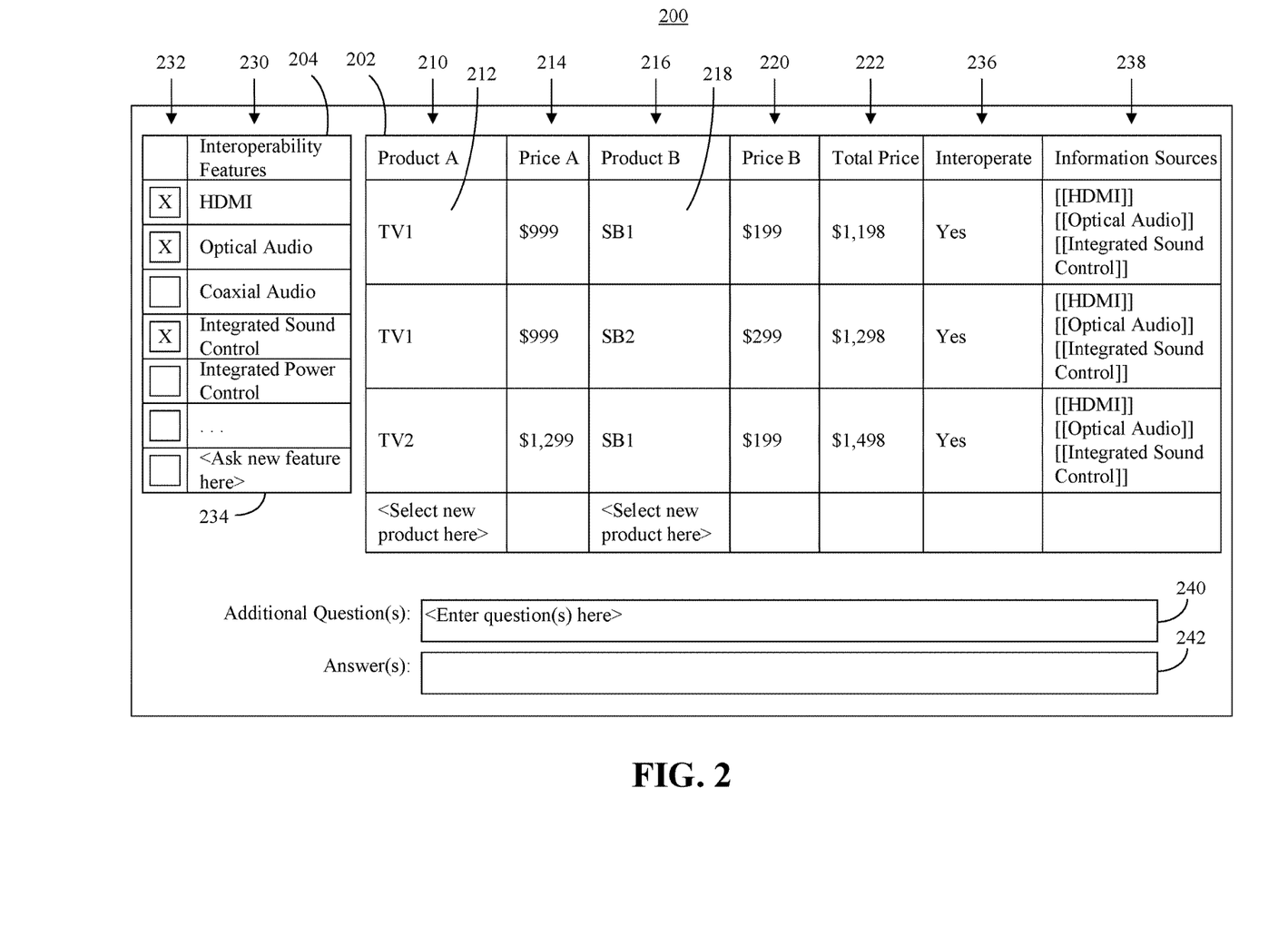
FIG. 2 depicts a view of an example user interface.

FIG. 2 depicts a view 200 of an example of the user interface 112. In this regard, the user interface 112 can be a guided user interface that guides the user through the process of determining the interoperability of multiple electronic products. The guided user interface can be dynamically customized, by the business logic module 114, for the user based on the user's profile information, including user preferences, and results from the aforementioned data searches.

The view 200 can include, for example in a table 202, a column 210 in which the user selects one or more products in respective fields. For example, a user selectable field 212 can be presented in the column 210. Responsive to the user selecting a field 212, a menu of products (not shown) can be presented to the user. From the menu, the user can select one or more products for which the user is interested in determining interoperability with one or more other products. A product selected by the user can be added to the field 212. At any time the user can again select an additional field in the column 210 to choose additional products to be added to the column 210. The view 200 also can include a column 214, which presents to the user a price of each of the products selected by the user and presented in the column 210.

The view 200 further can include, in the table 202, a column 216 in which the user selects one or more other products for which interoperability with the products listed in the column 210 is to be determined. For example, for each product selected by the user and presented the column 210, a field 218 can be presented. The user can select the field 218 to select another product for which interoperability with a respective product in the column 210 is to be determined. Thus, products listed in a same row of the table 202 can be considered to be corresponding products. In this regard, for each product listed in column 210, another product can be selected for column 216.

The view 200 also can include, in the table 202, a column 220 which presents to the user a price of each of the products selected by the user and presented in the column 216. In addition, for each pair of products presented in columns 210, 216 (e.g., products identified in the same row of the table 202), a total price can be presented in a column 222. For example, a total price for TV1 and SB1 can be presented, a total price for TV1 and SB2 can be presented, a total price for TV2 and SB1 can be presented, etc.

Based on one or more products selected for the column 210 and/or one or more products selected for the column 216, the view 200 can present a plurality of interoperability features associated with the selected products. In illustration, the view 200 can present, in a table 204, a column 230 that contains a listing of the interoperability features potentially applicable to the selected products, and a column 232 configured to receive user inputs to select items from the column 230 to indicate interoperability features desired by the user. For example, the column 232 can include check boxes selectable by the user to choose corresponding desired interoperability features. By selecting one or more fields in the column 232, the user indicates a question of whether the electronic products indicated in the column 210 are interoperable with corresponding electronic products indicated in column 216. That is, the user is indicating a question, for each row, whether "Product A" is interoperable with "Product B." In the example shown, the user is asking whether "TV1" is interoperable with "SB1" using "HDMI," "Optical Audio," and "Integrated Sound Control," whether "TV1" is interoperable with "SB2" using "HDMI," "Optical Audio," and "Integrated Sound Control," and whether "TV2" is interoperable with "SB1" using "HDMI," "Optical Audio," and "Integrated Sound Control."

In addition, a field 234 and corresponding check box in column 232 can be provided to allow the user to specify additional interoperability features. Responsive to the user selecting the field 234, a menu of additional interoperability features can be presented to the user, and the user can select one or more of these additional interoperability features. In another arrangement, the user can enter one or more interoperability features, for example by typing an interoperability feature in the field 234 or by providing a spoken utterance, detected by the user interface 112, indicating an interoperability feature. The user can select the corresponding checkbox in the column 232 to make the field 234 active.

Responsive to the user choosing and/or entering specific interoperability features in the column 230, the business logic module 114 (FIG. 1) can determine whether, for each pair of products selected in columns 210 and 216, the products are interoperable using the selected/entered interoperability features, for example as previously described using the API 122 and/or AI-NLP module 120. For example, if the user selects "HDMI," the business logic module 114 can determine, using the processes previously described, whether each pair of selected products can interoperate using HDMI. The view 200 can include a column 236 that indicates, based on the determination made by the business logic module 114, whether each pair of products are interoperable based on each of the interoperability features selected by the user. Further, the view 200 can include a column 238 which indicates information sources accessed by the business logic module 114 to determine whether the products are interoperable. In one arrangement, each item listed in the column 238 can be provided as a link, selectable by the user, to the respective information source. Accordingly, the user can select the link to review such information.

In one arrangement, the view 200 further can include a field 240 configured to receive, via text or spoken utterances provided by the user, specific questions related to interoperability of selected products. The field 240 also can be configured to receive other questions related to the products. Responsive to receiving one or more user inputs entering a question into the field 240, the business logic module 114 can interface with the API 122 and/or AI-NLP module 120 (FIG. 1) to generate a natural language analysis pertaining to the question of whether the electronic products indicated in column 210 are interoperable respective electronic products indicated in column 216, and initiate a search of the retail partner systems 140 and/or web based forums 150 to find an answer to the question, for example using processes previously described. If one or more answers are found, the business logic module 114 can present such answer(s) in a field 242. If not, the business logic module 114 can post the question(s) in one or more web based forums 150, as previously described. Further, when answer(s) to the question(s) is/are posted in the web based forum(s) 150, the AI-NLP module 120 can identify such messages, and the business logic module 114 can present the answer(s) to the user, as previously described. As noted, such answers also can be stored by the business logic module 114 to the knowledge datastore 118. Accordingly, such answers will be available if other users as the same or similar questions.

In some cases, questions entered by the user into the field 240 may not be clear, or additional information may be required. In illustration, based on the question asked, the AI-NLP module 120 may not be able to identify a web based forum 150 suitable for retrieving an answer to the question. In such case, the AI-NLP module can indicate to the business logic module 114 that further information related to the question is required. In response, the business logic module 114 can present a message (not shown) in the view 200 prompting the user to clarify the question or to provide additional information. Responsive to receiving the additional information, the business logic module 114 can provide the information, along with the originally posted question, to the AI-NLP module 120. The AI-NLP module 120 then can re-initiate a search of the web based forums 150 for an answer to the question, and post the question and information, as previously described, if an answer is not found.

Moreover, answers provided may cause the user for formulate new questions, or the user may wish further clarification on answers provided. At any time, the user can update questions and/or information provided, and re-initiate a search to the user's question using the additional information/questions provided by the user. Again, the search can be performed, and results can be presented to the user, as described herein. Further, information gathered responsive to the user's questions and/or provided information can be stored to the knowledge datastore 118, as previously described.

In one aspect, the business logic module 114 can process questions/information entered by the user into fields of the view 200 to determine other product combinations that may be of interest to the user. For example, if product combinations selected by the user do not satisfy each of the interoperability features identified by the user, but the business logic module 114 is able to identify other product combinations that do satisfy such interoperability features, the business logic module 114 can add those products in the respective columns 210, 216. For instance, two products that will interoperate together can be added to the same row in the view. Further, pricing information, information sources, etc. also can be added to the respective columns 214, 220, 222, 238, and the products can be indicated is being interoperable in the column 236. This can simplify the user's search for finding products that interoperate with one another in a manner desired by the user.

At this point it should be noted that the present arrangements are not limited to pairs of products. In one arrangement, a user can select more than two products, and the business logic module 114 can determine interoperability of each of the products among each other. For example, a user can select a particular television, a particular sound bar, a particular sub-woofer, and a particular remote control unit, and the business logic module 114 can determine whether each of these selected products will interoperate together as an entire system. Again, results of such determination can be presented to the user in the view in the manner previously described.

Figure 3:
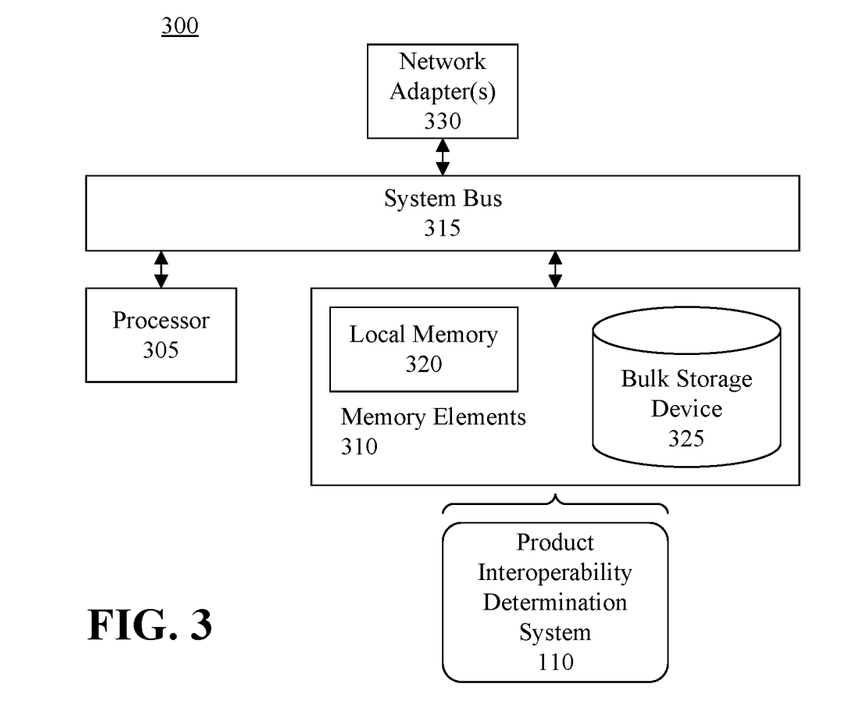
FIG. 3 is a block diagram illustrating example architecture for a data processing system.

FIG. 3 is a block diagram illustrating example architecture for a data processing system 300. The data processing system 300 can include at least one processor 305 (e.g., a central processing unit) coupled to memory elements 310 through a system bus 315 or other suitable circuitry. As such, the data processing system 300 can store program code within the memory elements 310. The processor 305 can execute the program code accessed from the memory elements 310 via the system bus 315. It should be appreciated that the data processing system 300 can be implemented in the form of any system including a processor and memory that is capable of performing the functions and/or operations described within this specification. For example, the data processing system 300 can be implemented as one or more computers, for example as one or more servers.

The memory elements 310 can include one or more physical memory devices such as, for example, local memory 320 and one or more bulk storage devices 325. Local memory 320 refers to random access memory (RAM) or other non-persistent memory device(s) generally used during actual execution of the program code. The bulk storage device(s) 325 can be implemented as a hard disk drive (HDD), solid state drive (SSD), or other persistent data storage device. The data processing system 300 also can include one or more cache memories (not shown) that provide temporary storage of at least some program code in order to reduce the number of times program code must be retrieved from the bulk storage device 325 during execution.

I/O devices can be coupled to the data processing system 300 either directly or through intervening I/O controllers. For example, one or more network adapters 330 can be coupled to data processing system 300 to enable the data processing system 300 to become coupled to other systems, computer systems, client devices and/or remote storage devices through intervening private or public networks. Modems, cable modems, transceivers, and Ethernet cards are examples of different types of network adapters 330 that can be used with the data processing system 300.

As pictured in FIG. 3, the memory elements 310 can store the product interoperability determination system 110. Being implemented in the form of executable program code, the product interoperability determination system 110 can be executed by the data processing system 300 and, as such, can be considered part of the data processing system 300. Moreover, the product interoperability determination system 110, including the various components of the product interoperability determination system 110, are functional data structures that impart functionality when employed as part of the data processing system 300 of FIG. 3.

Figure 4A:
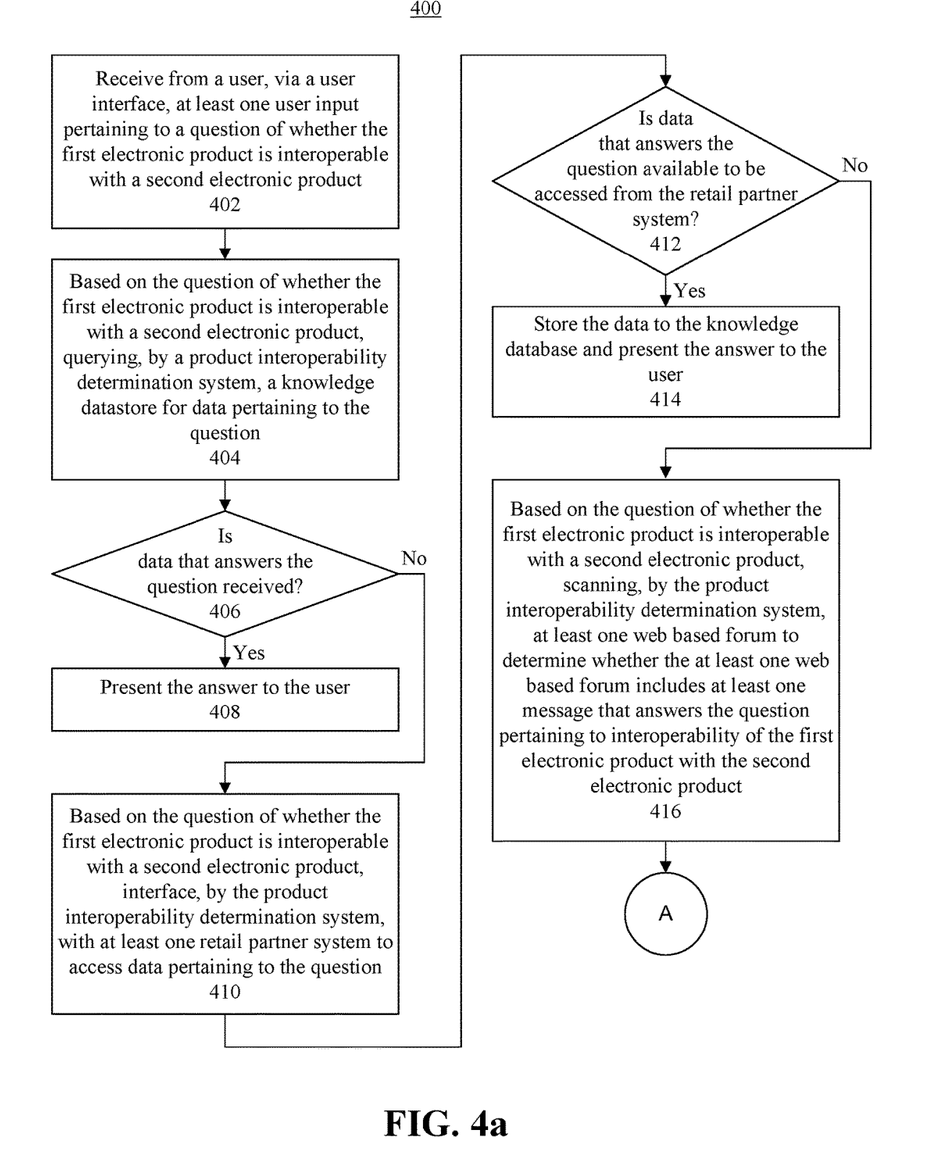
FIGS. 4a and 4b present a flow chart illustrating an example of a method of determining interoperability of electronic products.
Figure 4B:
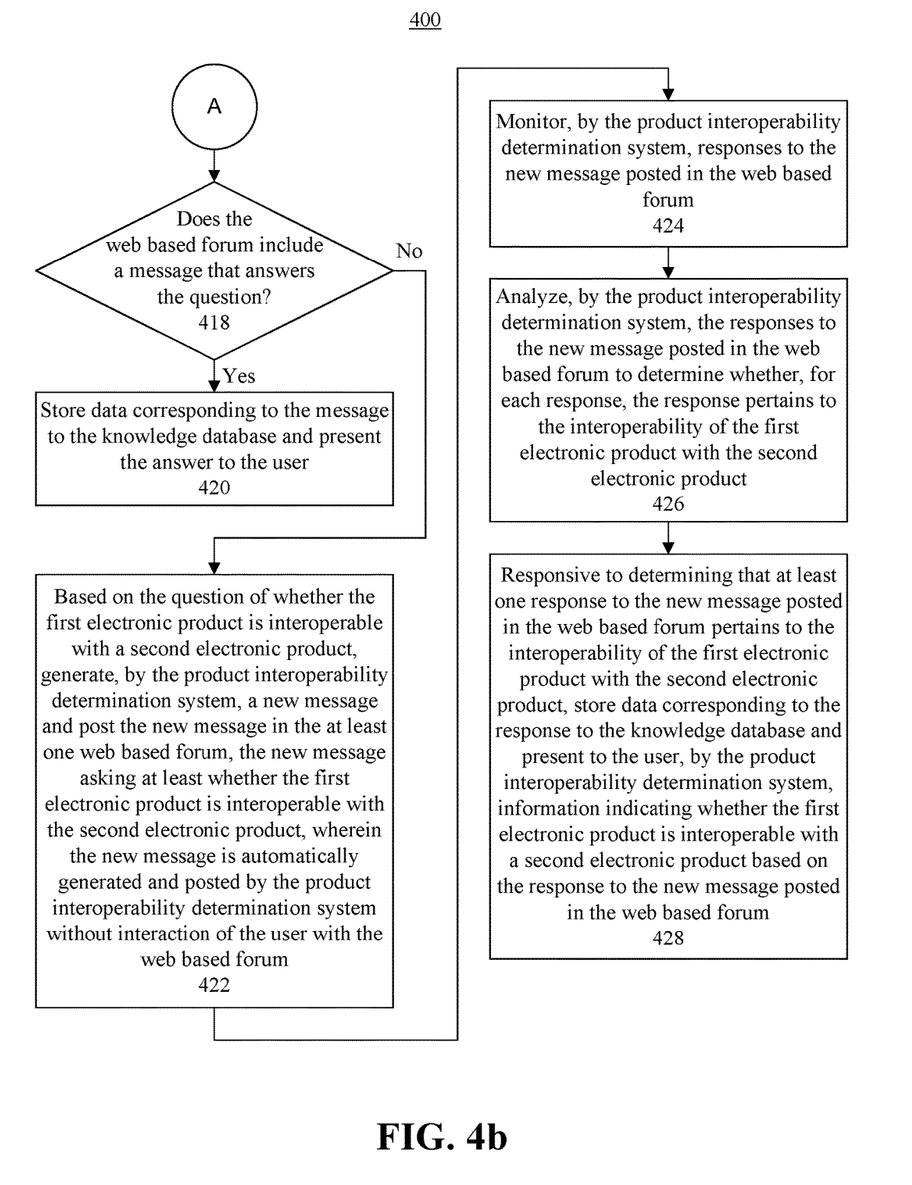

FIGS. 4a and 4b present a flow chart illustrating an example of a method 400 of determining interoperability of electronic products. At step 402, at least one user input can be received from a user via a user interface. The user input can pertain to a question of whether the first electronic product is interoperable with a second electronic product. At step 404, based on the question of whether the first electronic product is interoperable with a second electronic product, a product interoperability determination system can query a knowledge datastore for data pertaining to the question. Referring to decision box 406, if data that answers the question is received, at step 408 the answer to the question can be presented to the user.

If not, however, based on the question of whether the first electronic product is interoperable with a second electronic product, the product interoperability determination system can interface with at least one retail partner system to access data pertaining to the question. Referring to decision box 412, a determination can be made as to whether data that answers the question is available to be accessed from the retail partner system. If such data is available, at step 414 the data can be stored to the knowledge database and the answer to the question can be presented to the user.

If the data is not available from the retail partner system, at step 416, based on the question of whether the first electronic product is interoperable with a second electronic product, the product interoperability determination system can scan at least one web based forum to determine whether the at least one web based forum includes at least one message that answers the question pertaining to interoperability of the first electronic product with the second electronic product. Referring to decision box 418, if the web based forum includes a message that answers the question, at step 420 data corresponding to the message can be stored in the knowledge database and the answer to the question can be presented to the user.

If the web based forum does not include a message that answers the question, at step 422, based on the question of whether the first electronic product is interoperable with a second electronic product, the product interoperability determination system can generate a new message and post the new message in the at least one web based forum, the new message asking at least whether the first electronic product is interoperable with the second electronic product. The new message can be automatically generated and posted by the product interoperability determination system without interaction of the user with the web based forum. At step 424, the product interoperability determination system can monitor responses to the new message posted in the web based forum. At step 426, the product interoperability system can analyze the responses to the new message posted in the web based forum to determine whether, for each response, the response pertains to the interoperability of the first electronic product with the second electronic product. At step 428, responsive to determining that at least one response to the new message posted in the web based forum pertains to the interoperability of the first electronic product with the second electronic product, the product interoperability system can store data corresponding to the response to the knowledge database and present to the user information indicating whether the first electronic product is interoperable with a second electronic product based on the response to the new message posted in the web based forum.

With regard to FIGS. 4a and 4b, it should be noted that various steps described therein need not be mutually exclusive. For example, rather than exclusively performing various processes based on decisions that are made, one or more processes can be performed in combination. For example, the knowledge datastore, the retail partner system(s) and the web based forum(s) each can be queried, accessed and/or scanned to search for answers to the question presented by the user, and corresponding information retrieved from each of the data sources can be presented to the user. Based on the information presented, the user can make a decision as to which electronic products the user chooses to purchase.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
receiving from a user, via a user interface, at least one user input pertaining to a question;
based on the question, generating, by at least one processor, a new message and posting the new message in at least one web based forum, the new message based on the question, wherein the new message is automatically generated and posted by the processor without interaction of the user with the web based forum;
monitoring, by the processor, responses to the new message posted in the web based forum;
analyzing, by the processor, the responses to the new message posted in the web based forum to determine whether, for each response, the response pertains to a subject of the question; and
responsive to determining that at least one response to the new message posted in the web based forum pertains to subject of the question, presenting to the user, by the processor, information contained in the response.

2. The method of claim 1, further comprising:
analyzing, using a natural language processing system, the at least one user input pertaining to the question to generate a natural language analysis, the natural language analysis deriving a computer understandable meaning pertaining to the question;
wherein generating, by the processor, the new message comprises generating the new message based on the natural language analysis of the at least one user input pertaining to the question.

3. The method of claim 1, further comprising:
based on the question, scanning, by the processor, the at least one web based forum to determine whether the at least one web based forum includes at least one message that answers the question;
wherein generating, by the processor, the new message is responsive to determining that the at least one web based forum does not include at least one message that answers the question.

4. The method of claim 1, wherein the questions asks whether a first electronic product is interoperable with a second electronic product.

5. The method of claim 1, further comprising:
presenting to the user the user interface, the user interface presenting at least a first field in which the user identifies a first product, at least a second field in which the user identifies a second product, and at least a third field in which the user identifies a desired interoperability feature of the first product with the second product, wherein identification of the first product, the second product and the desired interoperability of the first product with the second product represents the question.

6. The method of claim 5, wherein the user interface further presents at least a fourth field indicating links to the at least one response in the web based forum.

7. The method of claim 1, further comprising:
presenting to the user the user interface, the user interface presenting one field to receive a text input from the user, the text input representing the question.

8. A system, comprising:
a processor programmed to initiate executable operations comprising:
receiving from a user, via a user interface, at least one user input pertaining to a question;
based on the question, generating a new message and posting the new message in at least one web based forum, the new message based on the question, wherein the new message is automatically generated and posted by the processor without interaction of the user with the web based forum;

monitoring responses to the new message posted in the web based forum;

analyzing the responses to the new message posted in the web based forum to determine whether, for each response, the response pertains to a subject of the question; and responsive to determining that at least one response to the new message posted in the web based forum pertains to subject of the question, presenting to the user information contained in the response.

9. The system of claim 8, the executable operations further comprising:

analyzing, using a natural language processing system, the at least one user input pertaining to the question to generate a natural language analysis, the natural language analysis deriving a computer understandable meaning pertaining to the question;

wherein generating the new message comprises generating the new message based on the natural language analysis of the at least one user input pertaining to the question.

10. The system of claim 8, the executable operations further comprising:

based on the question, scanning the at least one web based forum to determine whether the at least one web based forum includes at least one message that answers the question;

wherein generating the new message is responsive to determining that the at least one web based forum does not include at least one message that answers the question.

11. The system of claim 8, wherein the questions asks whether a first electronic product is interoperable with a second electronic product.

12. The system of claim 8, the executable operations further comprising:

presenting to the user the user interface, the user interface presenting at least a first field in which the user identifies a first product, at least a second field in which the user identifies a second product, and at least a third field in which the user identifies a desired interoperability feature of the first product with the second product, wherein identification of the first product, the second product and the desired interoperability of the first product with the second product represents the question.

13. The system of claim 12, wherein the user interface further presents at least a fourth field indicating links to the at least one response in the web based forum.

14. The system of claim 8, the executable operations further comprising:

presenting to the user the user interface, the user interface presenting one field to receive a text input from the user, the text input representing the question.

15. A computer program product comprising a computer readable storage medium having program code stored thereon, the program code executable by a processor to perform a method comprising:

receiving from a user, via a user interface, at least one user input pertaining to a question;

based on the question, generating, by the processor, a new message and posting the new message in at least one web based forum, the new message based on the question, wherein the new message is automatically generated and posted by the processor without interaction of the user with the web based forum;

monitoring, by the processor, responses to the new message posted in the web based forum;

analyzing, by the processor, the responses to the new message posted in the web based forum to determine whether, for each response, the response pertains to a subject of the question; and responsive to determining that at least one response to the new message posted in the web based forum pertains to subject of the question, presenting to the user, by the processor, information contained in the response.

16. The computer program product of claim 15, the method further comprising:

analyzing, using a natural language processing system, the at least one user input pertaining to the question to generate a natural language analysis, the natural language analysis deriving a computer understandable meaning pertaining to the question;

wherein generating, by the processor, the new message comprises generating the new message based on the natural language analysis of the at least one user input pertaining to the question.

17. The computer program product of claim 15, the method further comprising:

based on the question, scanning, by the processor, the at least one web based forum to determine whether the at least one web based forum includes at least one message that answers the question;

wherein generating, by the processor, the new message is responsive to determining that the at least one web based forum does not include at least one message that answers the question.

18. The computer program product of claim 15, wherein the questions asks whether a first electronic product is interoperable with a second electronic product.

19. The computer program product of claim 15, the method further comprising:

presenting to the user the user interface, the user interface presenting at least a first field in which the user identifies a first product, at least a second field in which the user identifies a second product, and at least a third field in which the user identifies a desired interoperability feature of the first product with the second product, wherein identification of the first product, the second product and the desired interoperability of the first product with the second product represents the question.

20. The computer program product of claim 19, the method further comprising, wherein the user interface further presents at least a fourth field indicating links to the at least one response in the web based forum.

* * * * *